E. J. LOBDELL.
CUTTER HEAD FOR JOINTERS.
APPLICATION FILED JUNE 24, 1916.

1,209,180.

Patented Dec. 19, 1916.

Inventor
Edward J. Lobdell,
By Pagelsen & Spencer
Attorneys

Witness
L. W. Patee

UNITED STATES PATENT OFFICE.

EDWARD J. LOBDELL, OF ONAWAY, MICHIGAN.

CUTTER-HEAD FOR JOINTERS.

1,209,180.  Specification of Letters Patent.  Patented Dec. 19, 1916.

Application filed June 24, 1916. Serial No. 105,579.

*To all whom it may concern:*

Be it known that I, EDWARD J. LOBDELL, a citizen of the United States, and residing at Onaway, in the county of Presque Isle and State of Michigan, have invented a new and Improved Cutter-Head for Jointers, of which the following is a specification.

The present invention has reference to a cutter head for jointers, and its object is to provide a device of this nature such that the cutters may be readily detached and ground and such that they may be substantially wholly used up in work before having to be replaced; also to provide means whereby their cutting edges may be conveniently and accurately adjusted with respect to the work.

The invention consists, primarily, in a shaft driven cutter head having cutters mounted thereon and arranged to be adjusted about axes parallel to but offset from the axis of the shaft (the cutting blades being non-continuous circumferentially about the cutters), together with means arranged to engage with any one of a plurality of contact surfaces on the cutters for imparting angular adjustment whereby the cutting teeth may be brought into proper cutting position as the cutters are ground or worn away.

The invention further consists in the details of construction shown, described and claimed.

Figure 1:
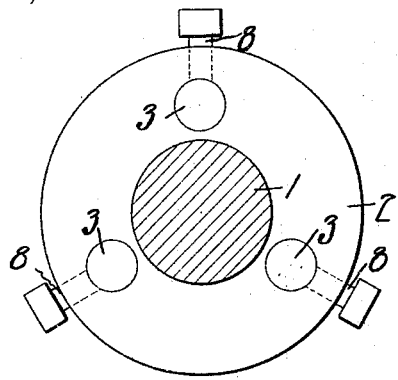
Figure 2:
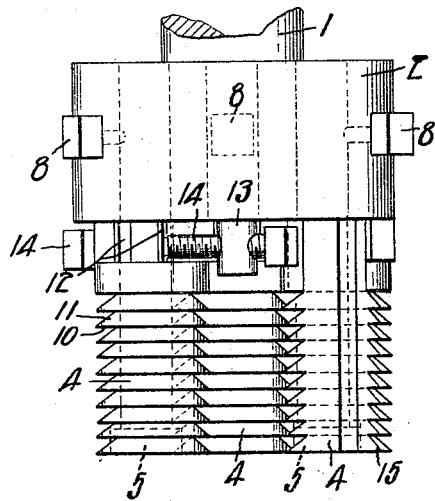
Figure 4:
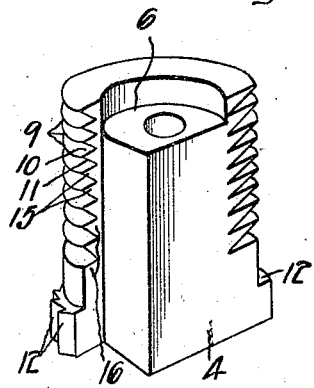
Figure 3:
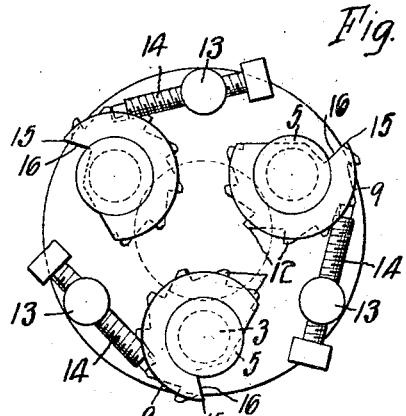

In the accompanying drawing, Figure 1 is a plan view of a preferred embodiment of the invention. Fig. 2 is a side view corresponding thereto. Fig. 3 is a bottom plan view. Fig. 4 is a perspective view of one of the cutters.

Secured to the driving shaft 1 in any suitable manner is an annular main cutter head member 2 which is drilled through longitudinally at intervals around a circle struck from the axis of the shaft to receive the shanks of bolts 3 that pass through and form journals for cutters 4 and have their annular heads 5 seated in recesses 6 in the lower ends of the latter. These bolts or journals are preferably retained in the main member by radial set screws 8. The cutters 4 comprise a series of blades 9 (each of which preferably has one face 10 in a plane perpendicular to the axis of the shaft and another face 11 at an angle thereto) above which is a set of ratchet teeth 12. Threaded longitudinally into the main member are blocks 13 perforated transversely and threaded to receive the adjusting screws 14 that are adapted to engage the ratchet teeth to turn the cutters about their axes until the cutting points or teeth 15 thereof are in proper adjustment. As the points wear away, the cutters are, of course, ground along the face 16 throughout their entire length, including the depth of the ratchet teeth, the engagement of the screws 14 for adjustment purposes being made successively with the various ratchet teeth, as is obvious. By this means use is not only made of substantially the whole cutter but accurate adjustment of the cutter points is readily secured throughout.

While the invention is not limited to cutters having teeth with faces 10 and 11 of the character described, these teeth are, nevertheless, of great importance in that they enable the convenient cutting of grooves in wood blocks having at one side walls (corresponding to the faces 10) parallel to the grain, which results in much stronger glued joints than can be secured with the ordinary V-grooves wherein both walls lie at an angle to the grain.

I claim:—

1. A cutter head for jointers comprising a main member arranged to be driven by a shaft, a journal projecting from the main member, the axis of said journal being offset from and parallel to the axis of said shaft, a cutter adjustable angularly about said journal, and a screw movable transversely with reference to the main member whereby the cutter may be brought into proper cutting relation.

2. A cutter head for jointers comprising a main member arranged to be driven by a shaft, a cutter, means for pivotally supporting the cutter on the main member in such manner that the cutter is capable of being adjusted about an axis which is offset from and parallel to that of the shaft, said cutter having a plurality of adjusting teeth and having a cutting point, and rotatable means arranged to move as a whole along its own axis of rotation to engage a desired adjusting tooth whereby the cutter may be adjusted angularly into proper cutting relation.

3. A cutter head for jointers comprising a cutter having a non-continuous peripheral cutting blade on which a cutting tooth may be formed by grinding transversely of said blade, and also having a plurality of peripherally arranged adjusting teeth, a main shaft-driven member, means for supporting the cutter upon the main member in such manner that the cutter is adjustable angularly about an axis offset from the axis of the shaft by which the main member is driven, and a screw supported by the main member, said screw being movable as a whole along its own axis of rotation for engaging a desired adjusting tooth whereby the cutting tooth may be brought into proper cutting relation as the blade is worn or ground away.

EDWARD J. LOBDELL.